June 2, 1964    P. RICHARDSON    3,135,870
SYNCHRONOUS CONDENSER START-UP CIRCUIT
Filed Jan. 9, 1959
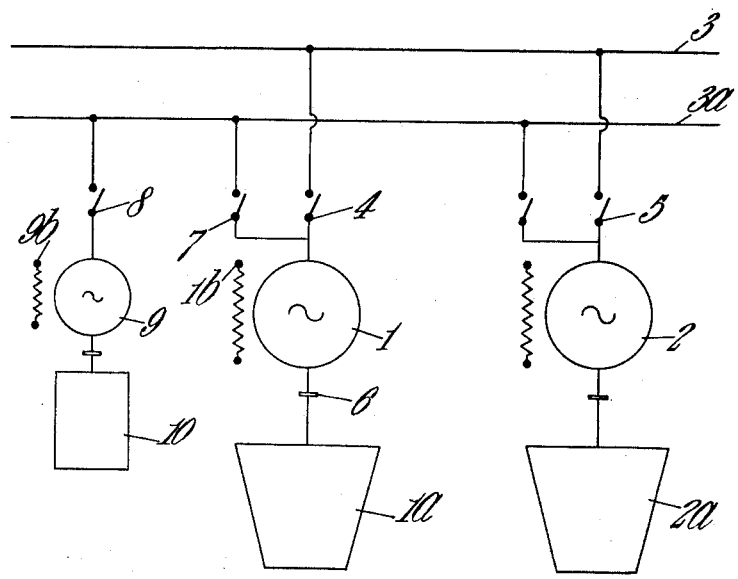

United States Patent Office

3,135,870
Patented June 2, 1964

1

3,135,870
SYNCHRONOUS CONDENSER START-UP CIRCUIT
Philip Richardson, Newcastle-upon-Tyne, England, assignor to C. A. Parsons & Company Limited, Newcastle-upon-Tyne, England
Filed Jan. 9, 1959, Ser. No. 785,970
Claims priority, application Great Britain Jan. 15, 1958
7 Claims. (Cl. 307—57)

The invention relates to dynamo electric machines.

In those cases where electricity, generated by dynamo electric machines in a power station, has to be transmitted over long distances it is sometimes necessary to utilise an alternating current generator as a synchronous condenser for voltage control.

One method of achieving this is to provide sufficient steam to a steam turbine driving the generator to run the unit up to speed for synchronising and to keep the turbine cool. Such a method has the disadvantage that it is necessary to utilise a boiler to provide the steam and is an uneconomical method of operation.

Alternatively means can be provided for uncoupling the generator from its turbine and utilising another or spare turbo-generator for running it up to synchronising speed.

The disadvantage of this method is that another or spare turbo-generator must be available for running up the generator required as a synchronous condenser and it must be capable of supplying the magnetising current for the latter, which current may approach the same order as the rated current.

Another method is to uncouple the generator which is to be used as a synchronous condenser from its turbine and provide a mechanical drive for the generator by means of an induction motor coupled to the generator through gearing, the latter being arranged to take the generator up to, or just above, synchronous speed to permit synchronising. Where the power station contains a number of generators, any or all of which may be required to operate as synchronous condensers, this requires provision of a motor with gearing for each generator and this represents an appreciable capital outlay. In addition, the length of foundation block must be increased to allow for the installation of the motor and gearing, and this leads to increased building costs.

The object of the present invention is to provide in dynamo electric machines means whereby an alternating current generator can be run as a synchronous condenser such that some or all of the above-mentioned drawbacks are substantially overcome.

The invention consists in a method of causing an alternating current generator, uncoupled from its prime mover, to operate as a synchronous condenser for an electric supply system by using an auxiliary alternating current generator capable of being driven at speeds up to synchronous speed, in which method the first mentioned generator is electrically coupled to the auxiliary generator, is supplied with excitation current and is caused to rotate so as to produce, electrically, a driving torque in the auxiliary generator, excitation being supplied to the said auxiliary generator to cause it to rotate in synchronism with the first mentioned generator and the two generators being run up to synchronous speed by increasing the speed of the auxiliary generator at which synchronous speed the first mentioned generator is synchronised with the supply system as a synchronous condenser and the said auxiliary generator is disconnected therefrom.

The invention also consists in a method in accordance with the preceding paragraph in which separate excitation is applied to the generators so that both start-up from rest in synchronism.

The invention also consists in a method as claimed in the first of the preceding two paragraphs in which the first mentioned generator is supplied with an excitation current and then when rotation is produced in the auxiliary generator the latter is supplied with an excitation current to cause it to rotate in synchronism with the first mentioned generator.

The invention also consists in means for carrying out the method of the preceding three paragraphs comprising means for rotating an alternating current generator which is to be run as a synchronous condenser when said generator is uncoupled from its prime mover, and an auxiliary alternating current generator electrically coupled to the first mentioned generator driven by a prime mover and capable of being run-up to synchronous speed.

The invention also consists in means in accordance with the preceding paragraph in which the prime mover for the auxiliary generator is a slip ring induction motor.

The invention also consists in means in accordance with either of the preceding two paragraphs in which the auxiliary generator is of multi-pole form, an additional pair of poles being provided to allow the auxiliary generator to run at synchronous speed.

The invention also consists in means as claimed in either of the first two of the preceding three paragraphs in which the auxiliary generator is coupled to its prime mover through gearing which allows the auxiliary generator to run at synchronous speed.

The invention also consists in means in accordance with any of the preceding four paragraphs in which the means for rotating the generator to be run as a synchronous condenser, is conventional turning gear provided for rotating the said generator and its prime mover when the latter is not providing the necessary drive.

The invention also consists in means in accordance with any of the preceding five paragraphs applied in power stations in which alternating current generators are driven by turbines.

The invention also consists in a method and means in dynamo electric machinery substantially as described with reference to the accompanying diagrammatic drawings.

In carrying the invention into effect in one form by way of example in a power station comprising turbine driven alternating current generators, one or more of the generators is adapted to be uncoupled from its turbine for use as a synchronous condenser in the electric supply system connected to the station.

The station is provided with an auxiliary alternating current generator driven by an induction motor of the slip ring type. This auxiliary generator is of smaller output than the turbine driven generators in the station.

When it is desired to run a generator hereinafter referred to as the incoming generator as a synchronous condenser it is uncoupled from its turbine and is electrically connected to the auxiliary generator.

Turning gear usually associated with turbo-generators for rotating the shaft at a low speed when steam is shut off from the turbine, is arranged to be capable of turning the incoming generator when the latter is uncoupled from the turbine. When excitation is applied to the incoming machine and when it is being driven by the turning gear, this generator will supply magnetising current to the small auxiliary generator. The magnetising current supplied to the smaller generator is therefore well within the capacity of the larger machine. The asynchronous torque developed in the auxiliary generator causes it to rotate at a slow speed approaching that of the incoming generator.

On the application of excitation to the auxiliary generator the two generators pull into step and can be run up to speed by means of the induction motor.

When the incoming generator has reached the desired speed it can be synchronised and the auxiliary generator set disconnected.

Among the advantages of such a scheme one is that one auxiliary generator can be used to run up all the generators in the station and the capital outlay is only that of a single motor driven auxiliary generator with its control equipment.

Another and important advantage is that by using the generator to be run as a synchronous condenser to produce electrically a driving torque in the auxiliary generator the rating of the latter can be kept small as it does not have to supply the full magnetising current for the incoming generator.

Instead of using an auxiliary generator of multi-pole type and supplying an additional pair of poles the motor driving the auxiliary generator may be coupled thereto through gearing so that the frequency of supply to the incoming generator can be raised to the synchronous frequency by suitable adjustment of the gear ratio.

The accompanying drawing shows diagrammatically an arrangement in accordance with one form of the invention. Two three phase alternating current generators 1 and 2 are shown driven by steam turbines 1a and 2a respectively. The three phase connections are shown in the form of a single line for the sake of simplicity.

Under normal operating conditions both generators 1 and 2 are connected in parallel with the main busbars 3 of the station, both generators supplying power to an electric supply system coupled to the busbars 3. In these circumstances switches 4 and 5 are closed and the other switches shown and described below, are open.

If it is desired to operate generator 1 as a synchronous condenser for the supply system the switch 4 is opened and the generator uncoupled from its turbine 1a through disengagement of coupling 6.

The generator 1 is then electrically coupled through auxiliary busbars 3a by closing switches 7 and 8, to an auxiliary alternating current generator 9 which is driven by a slip ring induction motor 10. Turning gear, not shown in the diagram, used in conventional turbo-generator practice to rotate the turbo-generator set at a slow speed usually of the order of 30 r.p.m. is then used to rotate the generator 1 and an excitation current is supplied to field winding 1b of the generator. An asynchronous torque is then produced in auxiliary generator 9 causing it to rotate.

When the field winding 9b of the generator 9 is supplied with excitation current it pulls into synchronism with the generator 1 and the motor 10 is then brought up to its synchronous speed. When the generator 1 is ready for synchronising with the supply system through busbars 3 the switch 4 is closed and the switches 7 and 8 opened.

As mentioned previously the excitation can be supplied to the field winding of both generator 1 and generator 9 simultaneously so that they start up from rest in synchronism.

Generator 2 can be operated as a synchronous condenser in similar fashion if so desired.

I claim:

1. An electrical supply system comprising an alternating current generator, a prime mover therefor and a coupling for connecting the prime mover to the generator and disconnecting it therefrom, an auxiliary alternating current generator capable of being driven at speeds up to at least synchronous speed, means for electrically coupling the first mentioned generator to the auxiliary generator, when the former has been disconnected from its prime mover means for supplying the first mentioned generator with excitation current and means causing it to rotate so as to produce electrically a driving torque in the auxiliary generator, means for supplying excitation current to the said auxiliary generator causing it to rotate in synchronism with the first mentioned generator, whereby the two generators may be run up to synchronous speed by increasing the speed of the auxiliary generator, and means for disconnecting the auxiliary generator at synchronous speed whereby the first mentioned generator is synchronized with the supply system as a synchronous condenser.

2. An electrical supply system according to claim 1, and comprising also a prime mover for driving the said auxiliary generator.

3. Means as claimed in claim 1, in which the auxiliary generator is driven by a slip ring induction motor.

4. Means as claimed in claim 1 in which the auxiliary generator is of multi-pole form, an additional pair of poles being provided to allow the auxiliary generator to run at synchronous speed.

5. Means as claimed in claim 1 in which the auxiliary generator is driven through gearing which allows the auxiliary generator to run at synchronous speed.

6. Means as claimed in claim 1 in which the means for rotating the generator to be run as a synchronous condenser, is conventional turning gear provided for rotating the said generator and its prime mover when the latter is not providing the necessary drive.

7. Means as claimed in claim 1 applied in power stations in which alternating current generators are driven by turbines.

No references cited.